UNITED STATES PATENT OFFICE.

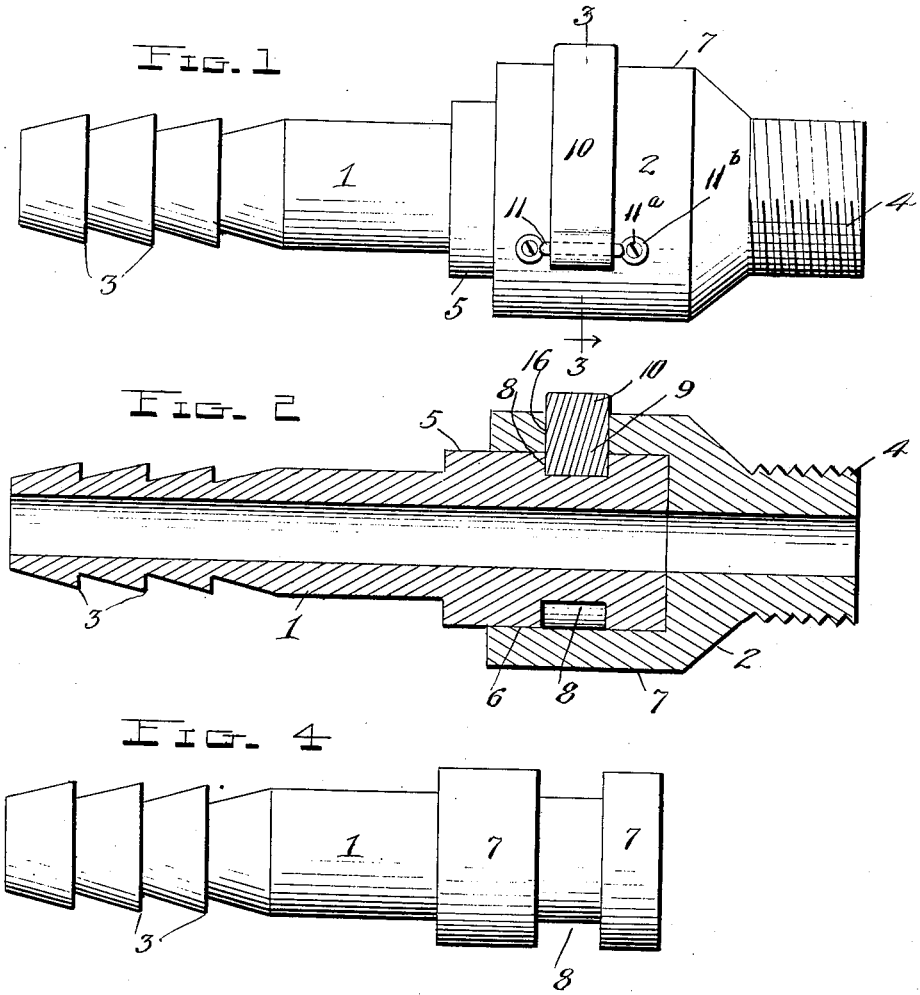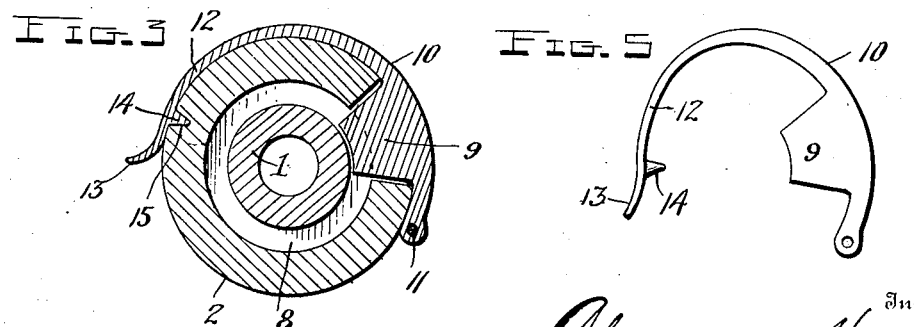

ALEXANDRE HEBERT, OF MONTPELIER, VERMONT.

PNEUMATIC-TOOL COUPLING.

No. 909,790.     Specification of Letters Patent.     Patented Jan. 12, 1909.

Application filed September 22, 1906. Serial No. 335,751.

*To all whom it may concern:*

Be it known that I, ALEXANDRE HEBERT, a citizen of the United States, residing at Montpelier, in the county of Washington and State of Vermont, have invented a new and useful Pneumatic - Tool Coupling, of which the following is a specification.

My invention is an improved pipe or hose coupling device.

The object of the invention is to provide a device of this character especially adapted for use in connection with pneumatic tools and which will permit of the easy connection and disconnection of two hose sections or a hose section and a tool, and also of the turning of the parts with respect to each other without twisting or tangling the hose.

With the above and other objects in view, the invention consists of the novel features of construction and the combination and arrangement of parts hereinafter fully described and claimed, and illustrated in the accompanying drawings, in which—

Figure 1 is a side elevation of my improved pneumatic hose coupling; Fig. 2 is a longitudinal section; Fig. 3 is a transverse section taken on the plane indicated by the line 3—3 in Fig. 1; Fig. 4 is a detail view of the inner section or member of the coupling; and Fig. 5 is a detail view of the pivoted locking member.

My improved coupling comprises inner and outer tubular sections or members 1, 2. The inner member 1 has its outer end formed with a series of annular, outwardly extending ribs 3 which serve to retain a hose upon it and the outer end of the other section 2 may be similarly constructed to receive a hose or it may be externally screw threaded as at 4 for the application of a pneumatic tool or the like. The inner end of the inner member 1 is formed with a cylindrical enlargement 5 adapted to enter and turn freely in a cylindrical socket or recess 6 formed in the enlarged inner end 7 of the outer section 2.

The enlargement or head 5 is formed with an annular groove 8 which provides a shoulder for the engagement of a locking projection 9 provided on the inner end of a pivoted locking member 10. The latter is substantially semi-circular in form and adapted to fit around the exterior of the enlarged end 7 of the section 2. The locking projection 9 is arranged at the inner end of said member, which end is formed with a pivot eye to receive a pivot 11, and its outer or free end 12 is resilient and provided with an outwardly curved finger piece 13 and an inwardly projecting pin or stud 14. Said pivot 11 has its projecting ends offset and enlarged to provide apertured attaching feet 11ª which engage the exterior of the outer member 2 and are secured thereon by screws or similar fastenings 11ᵇ. The stud 14 is adapted to enter a depression or seat 15 formed in the outer face of the section 2, when the locking portion or projection 9 projects through an opening 16 formed in said section 2 at a point approximately opposite the seat 15, as clearly shown in Fig. 3. When the locking member is in this position, the projection 9 extends into the groove 8 in the inner section to retain the latter in the outer section and at the same time permit it to rotate freely therein. Owing to the resiliency of the outer end 12 of the locking member and to the provision of the stud 14 and seat 15, said member will be effectively retained in its locking position, shown in Fig. 3; and may be quickly and easily moved to an inoperative position by simply engaging the finger piece 13 to lift the stud 14 out of its seat 15 and then swinging the member 10 upon its pivot 11 to move the inwardly extending portion or projection 9 out of the groove 8 in the member 1.

From the foregoing it will be seen that my invention, while applicable for connecting hose and pipes of various kinds, is especially adapted for coupling two hose sections or a pneumatic tool and a hose section; since said parts, when thus connected, may turn freely upon each other without tangling or twisting the hose, and they may be quickly and easily disconnected and as readily connected together again.

Having thus described my invention what I claim is:

The herein described coupling comprising inner and outer sections, the inner section having a cylindrical head formed with a continuous annular groove and the outer section having one of its ends formed with a cylindrical socket to receive the head of the inner section, said outer section being also formed with a radial slot and with a depression, a substantially semi-circular locking member constructed of resilient metal, its inner end being formed with a pivot eye and its outer end with an outwardly turned finger piece, a pivot arranged in the pivot eye of the locking member and having its ends offset and enlarged to provide apertured attaching feet, the latter being engaged with the exterior of the outer section, fastenings passed through said attaching feet and into the last mentioned section, a segmental-shaped locking projection formed integral with the locking member upon the inner face of the same adjacent to its pivot eye and being adapted to project through the slot in the outer section and to enter the groove in the inner section to lock said sections together, and a locking pin formed integral with the locking member upon its inner face adjacent to its outer end and adapted to enter said depression in the outer section whereby the locking member will be retained in its operative position, substantially as set forth.

ALEXANDRE HEBERT.

Witnesses:
BENJAMIN GATES,
L. M. SHEDD.